US012226068B2

(12) United States Patent
Yang et al.

(10) Patent No.: US 12,226,068 B2
(45) **Date of Patent: *Feb. 18, 2025**

(54) VACUUM CLEANER

(71) Applicant: LG Electronics Inc., Seoul (KR)

(72) Inventors: Ingyu Yang, Seoul (KR); Jinhyouk Shin, Seoul (KR); Daeho Chang, Seoul (KR); Kyoungho Ryou, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/927,276

(22) PCT Filed: May 21, 2021

(86) PCT No.: PCT/KR2021/006367

§ 371 (c)(1),
(2) Date: Nov. 22, 2022

(87) PCT Pub. No.: WO2021/235896

PCT Pub. Date: Nov. 25, 2021

(65) Prior Publication Data

US 2023/0190056 A1 Jun. 22, 2023

(30) Foreign Application Priority Data

May 22, 2020 (KR) ........................ 10-2020-0061898
Aug. 12, 2020 (KR) ........................ 10-2020-0101332

(51) Int. Cl.
*A47L 9/10* (2006.01)
*A47L 9/16* (2006.01)
(Continued)

(52) U.S. Cl.
CPC ............. *A47L 9/108* (2013.01); *A47L 9/1666* (2013.01); *A47L 9/1683* (2013.01);
(Continued)

(58) Field of Classification Search
CPC ........ A47L 9/106; A47L 9/108; A47L 9/1666; A47L 9/1683; A47L 9/1691; A47L 9/22;
(Continued)

(56) References Cited

U.S. PATENT DOCUMENTS

2010/0005617 A1 1/2010 Hyan et al.
2016/0015230 A1* 1/2016 Conrad ................ A47L 9/1691 15/344
(Continued)

FOREIGN PATENT DOCUMENTS

CN 10964588 4/2019
KR 10-0578350 5/2006
(Continued)

OTHER PUBLICATIONS

PE2E Translation KR-20180053614-A; Cleaner; Hwang, Philjae; May 23, 2018 (Year: 2018).*
(Continued)

*Primary Examiner* — Brian D Keller
*Assistant Examiner* — Sidney D Full
(74) *Attorney, Agent, or Firm* — Fish & Richardson P.C.

(57) ABSTRACT

A cleaner includes a dust bin, a motor housing disposed above and coupled to the dust bin, a handle coupled to the motor housing, a cyclone part disposed in the dust bin and configured to separate dust from air, a filter disposed in the dust bin and configured to filter air having separated the dust through the cyclone part, and a compression part configured to compress the dust in the dust bin. The compression part includes an operating part disposed in the motor housing and configured to move in a space between an outer portion of the filter part and an inner circumferential surface of the dust bin, a manipulation part disposed outside the motor housing and configured to be manipulated to move the operating part,
(Continued)

and a transmission part that is disposed in the motor housing and connects the operating part and the manipulation part.

20 Claims, 14 Drawing Sheets

(51) Int. Cl.

| | |
|---|---|
| ***A47L 9/22*** | (2006.01) |
| ***A47L 9/24*** | (2006.01) |
| ***A47L 9/32*** | (2006.01) |
| ***B04C 3/06*** | (2006.01) |
| ***B04C 9/00*** | (2006.01) |

(52) U.S. Cl.
CPC ............... *A47L 9/1691* (2013.01); *A47L 9/22* (2013.01); *A47L 9/248* (2013.01); *A47L 9/322* (2013.01); *B04C 3/06* (2013.01); *B04C 9/00* (2013.01); *B04C 2009/002* (2013.01)

(58) Field of Classification Search
CPC ........... A47L 9/248; A47L 9/322; A47L 5/24; B04C 3/06; B04C 9/00; B04C 2009/002

USPC ........................................................... 13/352
See application file for complete search history.

(56) References Cited

U.S. PATENT DOCUMENTS

| | | | | |
|---|---|---|---|---|
| 2016/0183750 A1* | 6/2016 | Fan | ....................... | A47L 13/225<br>15/347 |
| 2018/0132685 A1* | 5/2018 | Muir | ....................... | A47L 9/149 |
| 2020/0245833 A1* | 8/2020 | Lee | ....................... | A47L 9/1481 |

FOREIGN PATENT DOCUMENTS

| | | | | |
|---|---|---|---|---|
| KR | 10-1235891 | 2/2013 | | |
| KR | 20150125223 A * | 11/2015 | ............... | A47L 5/24 |
| KR | 10-2018-0023274 | 3/2018 | | |
| KR | 20180053614 A * | 5/2018 | ............... | A47L 5/24 |
| KR | 10-2071945 B1 | 1/2020 | | |
| KR | 10-2020-0037199 | 4/2020 | | |
| TW | 202017523 | 5/2020 | | |
| WO | WO 2018/038372 | 3/2018 | | |
| WO | WO 2020/055216 | 3/2020 | | |

OTHER PUBLICATIONS

PE2E Translation KR-20150125223-A; A Cleaner; Hyuk, Uim Dong; Nov. 9, 2015 (Year: 2015).*
Office Action in Taiwanese Appln. No. 110118476, mailed on Nov. 4, 2021, 20 pages (with English translation).
International Search Report and Written Opinion in Appln. No. PCT/KR2021/006367, mailed on Sep. 24, 2021, 12 pages (with English translation).
Extended European Search Report in European Appln. No. 21807856.6, mailed on Apr. 30, 2024, 8 pages.
Office Action in Korean Appln. No. 10-2022-7044978, mailed on Nov. 1, 2024, 16 pages (with English Translation).

* cited by examiner

VACUUM CLEANER

CROSS-REFERENCE TO RELATED APPLICATIONS

This application is a National Stage application under 35 U.S.C. § 371 of International Application No. PCT/KR2021/006367, filed on May 21, 2021, which claims the benefit of Korean Application Nos. 10-2020-0101332, filed on Aug. 12, 2020, and 10-2020-0061898, filed on May 22, 2020. The disclosures of the prior applications are incorporated by reference in their entirety.

TECHNICAL FIELD

The present disclosure relates to a cleaner, and more particularly, to a cleaner capable of compressing dust stored in a dust bin, thereby making it not necessary to frequently empty the dust bin.

BACKGROUND ART

In general, a cleaner refers to an electrical appliance that draws in small garbage or dust by sucking air using electricity and fills a dust bin with the garbage or dust. Such a cleaner is generally called a vacuum cleaner.

The cleaners may be classified into a manual cleaner which is moved directly by a user to perform a cleaning operation, and an automatic cleaner which performs a cleaning operation while autonomously traveling.

Further, depending on the shape of the cleaner, the manual cleaners may be classified into a canister cleaner, an upright cleaner, a handy cleaner, a stick cleaner, and the like.

Patent Document 1 (Korean Patent Application Laid-Open No. 10-2011-0106917) discloses a handheld vacuum cleaner.

The handheld vacuum cleaner includes a separation device that separates garbage and dust from an air flow.

The separation device includes a centrifugal separator having one or more cyclones.

The centrifugal separator includes a first cyclone having a dust collector. The dust collector may be disposed at a lower side of the first cyclone, and the dust collector may be opened or closed by a base. The base opens or closes the dust collector by being rotated by a hinge.

A plurality of through holes is provided in the first cyclone, and a cover partially having a trapezoidal shape is positioned in the first cyclone. A second cyclone communicates with the first cyclone in the cover.

In the case of Patent Document 1, air in the first cyclone passes through the plurality of holes and then flows in the second cyclone. The dust clogs the plurality of holes of the cover during the process in which the air passes through the plurality of holes.

Therefore, as the plurality of holes is clogged in large numbers, the air does not flow smoothly, and thus performance for separating dust and air deteriorates. Therefore, the user needs to clean the cover periodically.

In the case of Patent Document 1, because the user needs to open the dust collector by rotating the base and then approach the cover to clean the cover, there is a drawback in that it is not easy to clean the cover.

In addition, in the case of Patent Document 1, the dust separated from the first cyclone and the second cyclone is dropped downward and accumulated on the base.

When the operation of the cleaner is stopped during the process of separating the dust by the cleaner, the separated dust is stored in a low-density state in the dust collector.

In particular, because the dust separated by the first cyclone occupies an excessively large volume compared to a weight thereof, there is a drawback in that it is necessary to frequently remove the dust in the dust collector in order to maintain dust collecting performance.

Patent Document 2 (Japanese Patent No. 3699679) discloses a technology capable of compressing dust in a dust collecting casing.

The dust collecting casing includes a dust separating chamber configured to separate dust from air using a centrifugal force, a dust receiving chamber configured to receive the dust introduced from the dust separating chamber, an intake cylinder positioned at a central portion of the dust separating chamber, and a filter disposed outside the intake cylinder.

The air in the dust separating chamber passes through the filter and then enters the intake cylinder.

An outer container is provided outside the intake cylinder, a compression plate is provided at a lower side of the outer container, and brush bristles are provided on an inner circumferential surface of the outer container. The outer container has a plurality of opening portions so as not to interrupt an air flow from the dust separating chamber into the intake cylinder.

An operating lever is provided outside of the outer container in a diameter direction of the outer container in order to allow a user to manipulate the outer container. The operating lever is positioned outside the dust separating chamber.

Therefore, when the user manipulates the operating lever and moves the outer container together with the compression plate downward, the brush bristles on the inner surface of the outer container cleans the filter disposed along an outer circumference of the intake cylinder, and the compression plate compresses the dust stored in the dust receiving chamber.

However, according to Patent Document 2, because the outer container is configured to surround the entire intake cylinder in a state in which the operating lever is not manipulated, the plurality of opening portions is formed in the outer container to allow the air to pass through the outer container.

However, even though the plurality of opening portions is provided in the outer container, a portion having no opening portion acts as resistance against the air flow, and as a result, there is a drawback in that performance of the air flow deteriorates.

In addition, since the outer container is positioned outside the intake cylinder, the dust in the dust separating chamber comes into contact with the outer container in a state in which the operating lever is not manipulated. For this reason, there is a drawback in that the outer container is contaminated and an operation of cleaning the outer container is additionally required.

In addition, according to Patent Document 2, since the operating lever is provided outside the dust separating chamber, a slot needs to be provided in the dust separating chamber in an upward/downward direction in order to allow the operating lever to move in the upward/downward direction.

Because the operating lever cannot cover the entire slot, there is a problem in that the air and the dust in the dust separating chamber leak to the outside through the slot.

In addition, in the case of Patent Document 2, there is no structure for allowing the outer container to move upward or downward without deviation, and as a result, there is a problem in that the upward and downward movements of the outer container are not smoothly performed.

In addition, in the case of Patent Document 2, because the user may manipulate the operating lever after separating the dust collecting casing from a cleaner main body, which inconveniences the user during use.

DOCUMENTS OF RELATED ART

Patent Documents

Patent Document 1: Korean Patent Application Laid-Open No. 10-2011-0106917

Patent Document 2: Japanese Patent No. 3699679

DISCLOSURE

Technical Problem

An object of the present disclosure is to provide a cleaner having a compression part capable of compressing dust in a dust bin.

Another object of the present disclosure is to provide a cleaner in which a dust bin may be separated from a motor housing of the cleaner having a compression part.

Still another object of the present disclosure is to provide cleaner in which a sufficient interval is ensured between a dust bin and a secondary cyclone, such that it is possible to prevent a large foreign substance from being caught between the dust bin and secondary cyclone.

Yet another object of the present disclosure is to provide a cleaner in which a dust bin separated from a motor housing may be washed with water.

Still yet another object of the present disclosure is to provide a cleaner in which a sealing force in a direction in which a motor housing and a dust bin are coupled is increased.

Another further object of the present disclosure is to provide a cleaner in which a pipe connector of the cleaner is coupled to a dust bin and thus separated, together with the dust bin, from a motor housing, or the pipe connector is coupled to the motor housing such that the dust bin is separated.

Technical Solution

In order to achieve the above-mentioned objects, one aspect of the present disclosure provides a cleaner including: a dust bin configured to store dust sucked through a suction part; a motor housing disposed above the dust bin and coupled to the dust bin; a handle part coupled to the motor housing; a motor positioned in the motor housing; a cyclone part positioned in the dust bin and configured to separate the dust sucked through the suction part; a filter part positioned in the dust bin and configured to filter air during a process in which air from which the dust is separated in the cyclone part passes through the filter part; and a compression part configured to compress the dust in the dust bin, in which the compression part includes: an operating part disposed in the motor housing and configured to move in an upward/downward direction in a space between an outer portion of the filter part and an inner circumferential surface of the dust bin in the dust bin; a manipulation part disposed outside the motor housing and configured to be manipulated to move the operating part in the upward/downward direction; and a transmission part disposed in the motor housing and configured to connect the operating part and the manipulation part.

A compression rail part may be positioned in the motor housing and may guide an upward/downward movement of the transmission part.

The dust bin may be coupled to the motor housing so as to be separable in the upward/downward direction.

In a state in which the dust bin is separated from the motor housing, the operating part and the transmission part may be positioned in the motor housing, and the manipulation part may be positioned outside the motor housing.

The dust bin and the motor housing may be sealed by sealing member.

The sealing member may be positioned at an upper end of the dust bin or a lower end of the motor housing.

The cyclone parts may include: a first cyclone part configured to communicate with the pipe connector; and a second cyclone part configured to separate the dust from the air discharged from the first cyclone part, and the filter part may surround the second cyclone part.

An interval of 14 mm or more may be maintained between an inner circumferential surface of the dust bin and an outer circumferential surface of the second cyclone part.

Each of the motor housing and the dust bin may be formed in a cylindrical shape, a width of the handle part in a leftward/rightward direction may be smaller than a diameter of each of the motor housing and the dust bin, and the manipulation part may be spaced apart from a floor surface in a state in which the motor housing, the dust bin, and the handle part are placed to be in contact with the floor surface.

In the case of the cleaner configured as described above, the pipe connector connected to the suction part may be fixedly coupled to the motor housing or fixedly coupled to the dust bin.

As an example, in a case in which the pipe connector is fixedly coupled to the motor housing, the cleaner may further include a fastening part configured to couple the dust bin to the motor housing in such a way that the dust bin is separable from the dust bin.

The fastening part may include: a button positioned below the pipe connector; a hook positioned in a space between the button and the dust bin and configured to be rotated as the button is pushed; a first catching projection positioned on an outer surface of the dust bin and configured to be fastened to or unfastened from the hook in accordance with whether the hook rotates; and a second catching projection positioned at a lower portion of the outer surface of the dust bin opposite to the first catching projection and coupled to a groove of the handle part.

The hook may include: a first inclined surface configured to come into contact with a rib to rotate the hook clockwise; and a second inclined surface extending from the first inclined surface and configured to rotate the hook counterclockwise.

A terminal part may be positioned on the motor housing and disposed adjacent to the pipe connector, and the terminal part may supply electricity to the suction part when the suction part is coupled to the pipe connector.

As another example, in a case in which the pipe connector is coupled to the dust bin, the pipe connector, together with the dust bin, may be separated from the motor housing when the dust bin is separated from the motor housing.

A terminal part may be positioned on the motor housing and disposed adjacent to the pipe connector, and the terminal part may supply electricity to the suction part when the suction part is coupled to the pipe connector.

A support portion for supporting the pipe connector may be positioned on the dust bin.

Advantageous Effect

According to the present disclosure, the operating part constituting the simple cleaning system is positioned inside the motor housing, and the manipulation part is positioned outside the motor housing. As a result, the user may compress the dust in the dust bin by manipulating the manipulation part.

In addition, according to the present disclosure, the transmission part for transmitting a force for moving the operating part in the upward/downward direction is positioned on the compression rail part in the motor housing. As a result, the dust bin may be separated from the motor housing, and a sufficient interval is ensured between the dust bin and the secondary cyclone, such that it is possible to prevent a large foreign substance from being caught between the dust bin and secondary cyclone.

In addition, according to the present disclosure, since the dust bin is coupled to/separated from the motor housing in the upward/downward direction, it is possible to increase a sealing force in the direction in which the motor housing and the dust bin are coupled.

In addition, according to the present disclosure, the pipe connector coupled to the suction part of the cleaner is fixedly coupled to the dust bin or the motor housing, and the terminal part for supplying electricity to the suction part is installed on the motor housing. As a result, the dust bin may be washed with water.

MODE FOR INVENTION

Figure 1:
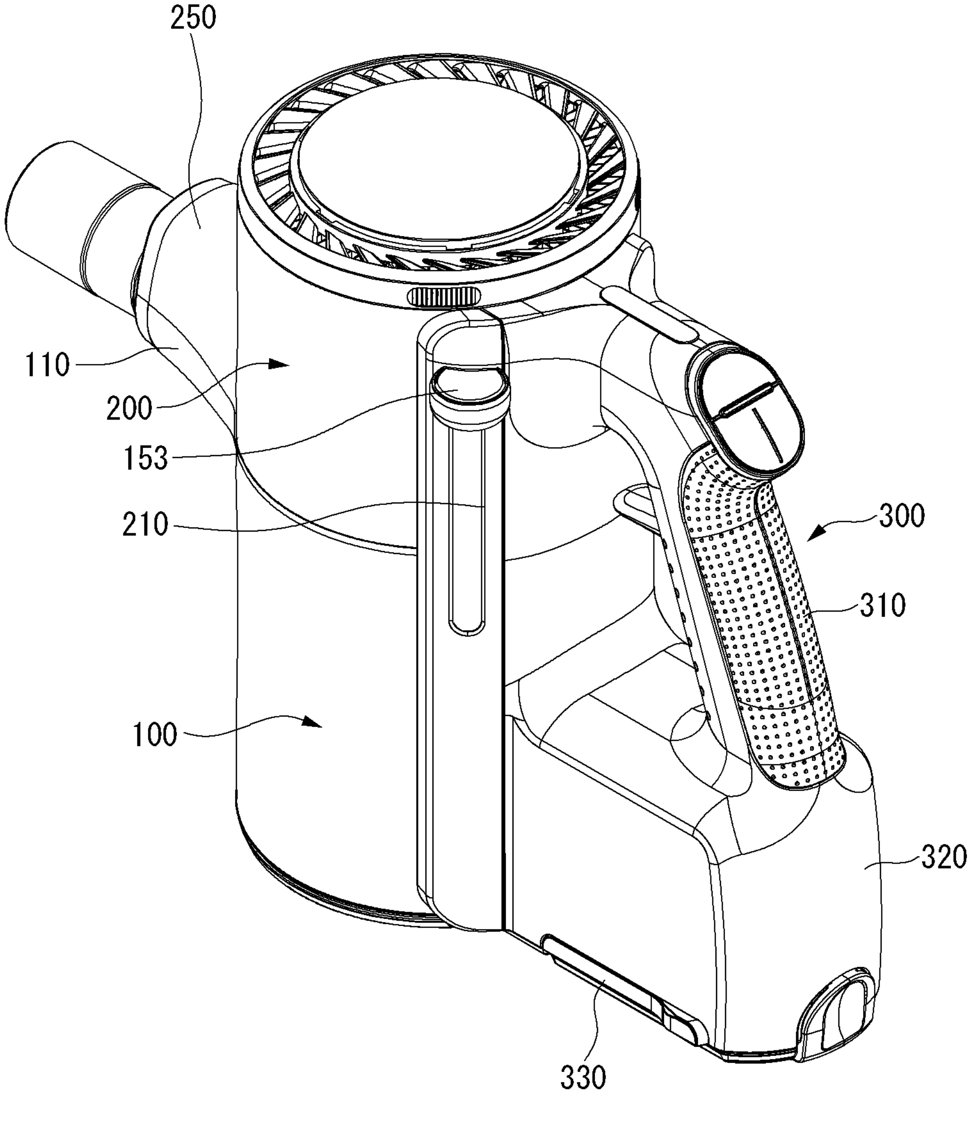
FIG. 1 is a perspective view illustrating an external appearance of a cleaner according to a first embodiment of the present disclosure.

Hereinafter, embodiments disclosed in the present disclosure will be described in detail with reference to the accompanying drawings. The same or similar constituent elements are assigned with the same reference numerals regardless of reference numerals, and the repetitive description thereof will be omitted.

However, the technical spirit of the present disclosure is not limited to some embodiments described herein but may be implemented in various different forms. One or more of the constituent elements in the embodiments may be selectively combined or substituted within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiment of the present invention are for explaining the embodiments, not for limiting the present invention.

Unless particularly stated otherwise in the context of the present disclosure, a singular form may also include a plural form. The explanation "at least one (or one or more) of A, B, and C" described herein may include one or more of all combinations that can be made by combining A, B, and C.

In addition, the terms first, second, A, B, (a), and (b) may be used to describe constituent elements of the embodiments of the present disclosure. These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "above (on) or below (under)" may include a meaning of a downward direction as well as an upward direction based on one constituent element.

Meanwhile, the term 'disclosure' may be substituted with a document, a specification, a description, and the like.

Hereinafter, a cleaner according to the present disclosure will be described with reference to the accompanying drawings.

Figure 2:
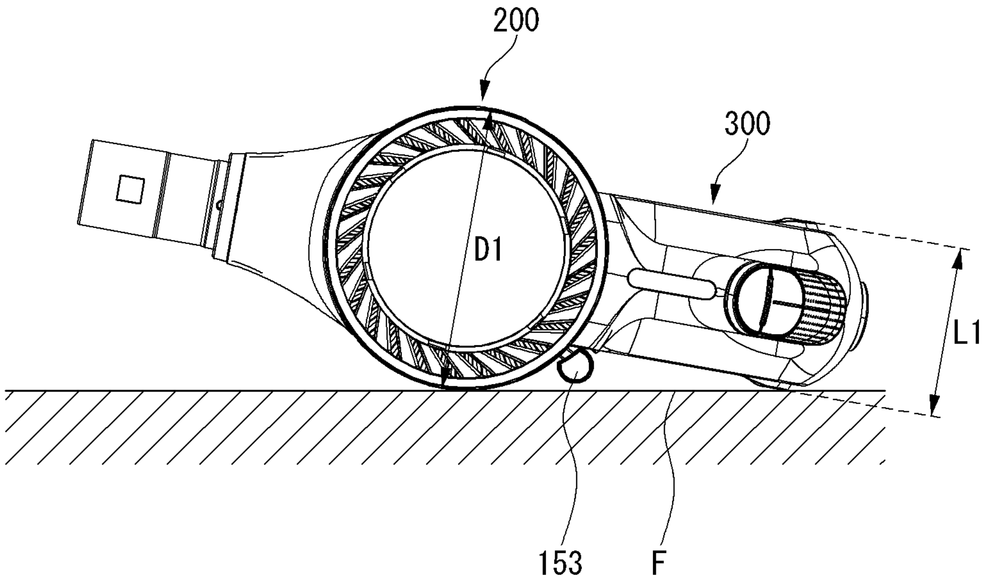
FIG. 2 is a view illustrating a state in which the cleaner according to the first embodiment of the present disclosure is laid and placed on a floor surface.
Figure 3:
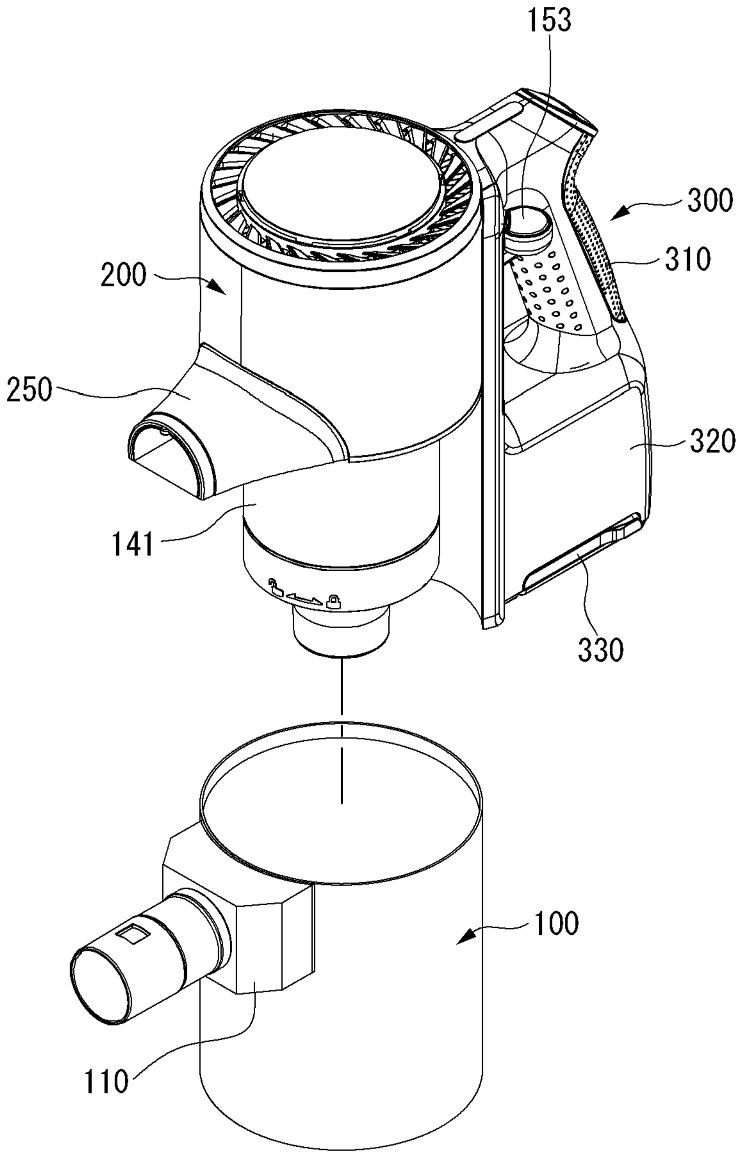
FIG. 3 is an exploded perspective view illustrating a main part of the cleaner according to the first embodiment of the present disclosure.

FIGS. 1 to 6 are views related to a cleaner according to a first embodiment of the present disclosure. FIG. 1 is a perspective view illustrating an external appearance of the cleaner according to the first embodiment of the present disclosure, FIG. 2 is a view illustrating a state in which the cleaner according to the first embodiment of the present disclosure is laid and placed on a floor surface, and FIG. 3 is an exploded perspective view illustrating a main part of the cleaner according to the first embodiment of the present disclosure.

Figure 4:
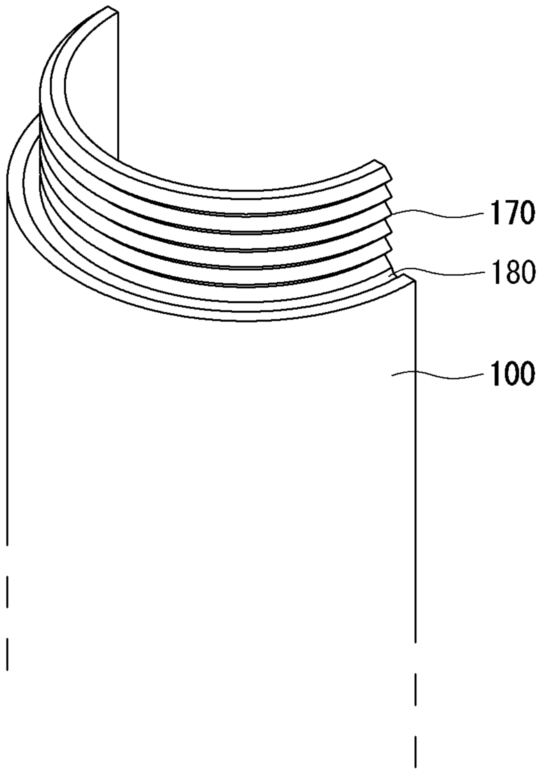
FIG. 4 is a perspective view illustrating a main part of a dust bin according to the first embodiment of the present disclosure.
Figure 5:
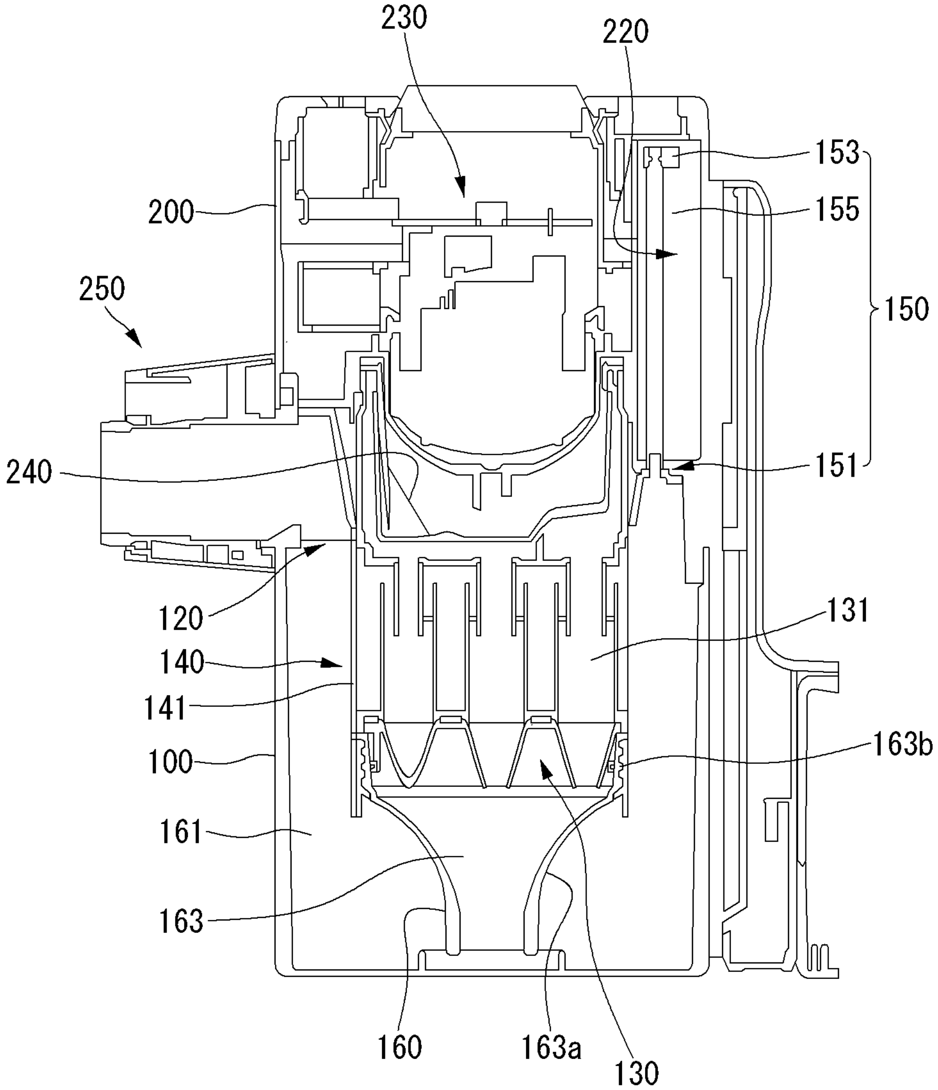
FIG. 5 is a cross-sectional view illustrating a state in which the dust bin and a motor housing according to the first embodiment of the present disclosure are coupled.
Figure 6:
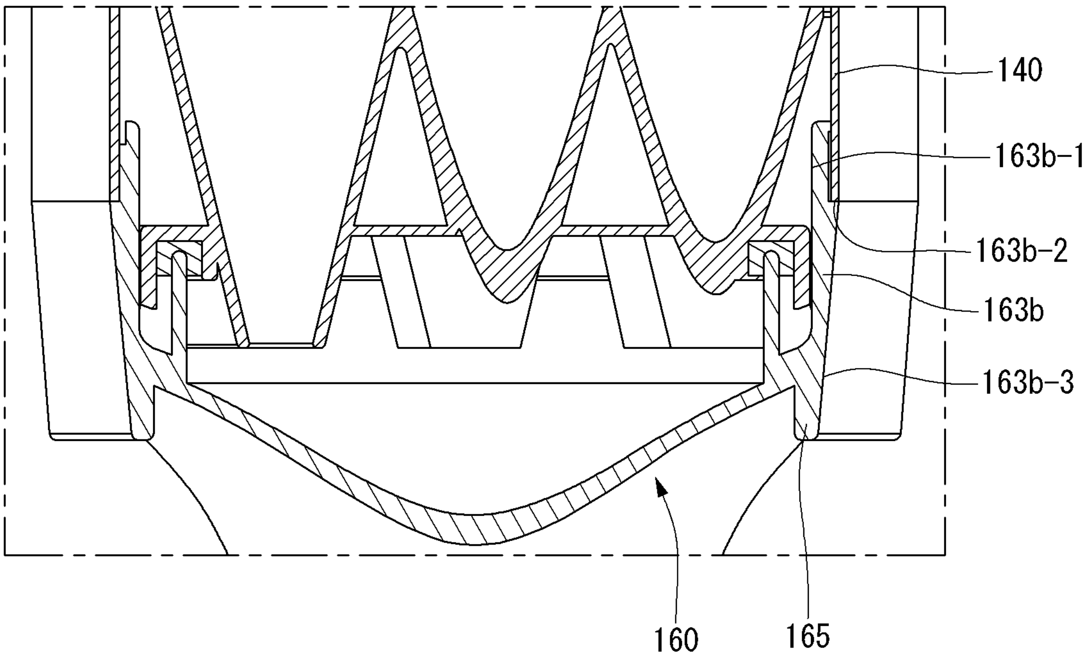
FIG. 6 is a cross-sectional view illustrating a state in which a lower portion of a filter part according to the first embodiment of the present disclosure is seated on a dust guide.

Further, FIG. 4 is a perspective view illustrating a main part of a dust bin according to the first embodiment of the present disclosure, FIG. 5 is a cross-sectional view illustrating a state in which the dust bin and a motor housing according to the first embodiment of the present disclosure are coupled, and FIG. 6 is a cross-sectional view illustrating a state in which a lower portion of a filter part according to the first embodiment of the present disclosure is seated on a dust guide.

Referring to FIGS. 1 to 6, a cleaner according to the first embodiment of the present disclosure may include a dust bin 100. The dust bin 100 may include a pipe connector 110 through which air containing dust is introduced. The pipe connector 110 may guide the air containing dust to the dust bin 100.

The cleaner may further include a motor housing 200 having a lower portion to which the dust bin 100 is coupled, and a handle part 300 coupled to the motor housing 200.

For example, the handle part 300 may be positioned on the motor housing 200 so as to be opposite to the pipe connector 110. However, the positions of the pipe connector 110 and the handle part 300 are not limited thereto.

The dust bin 100 may separate the dust introduced into the dust bin 100 through the pipe connector 110 and store the separated dust.

A dust separating part may be positioned in the dust bin 100. The dust separating part may include a first cyclone part 120 capable of separating the dust using a cyclone flow. The first cyclone part 120 may communicate with the pipe connector 110.

The air and the dust introduced through the pipe connector 110 may flow spirally or flow in the form of a funnel along an inner circumferential surface of the first cyclone part 120.

The dust separating part may further include a second cyclone part 130 configured to separate the dust from the air discharged from the first cyclone part 120.

The second cyclone part 130 may include a plurality of cyclone bodies 131 disposed in parallel. The air may pass through the plurality of cyclone bodies 131, respectively.

As another example, the dust separating part may have the single cyclone part.

For example, each of the dust bin 100 and the motor housing 200 having the lower portion to which the dust bin 100 is coupled may be formed in a cylindrical shape.

A lower side of the dust bin 100 may be opened or closed by a body cover that rotates by a hinge. In another embodiment, the lower side of the dust bin 100 may be integrated with a dust bin main body.

A filter part 140 may be positioned in the dust bin 100 and disposed to surround the second cyclone part 130.

For example, the filter part 140 is formed in a cylindrical shape and guide, to the second cyclone part 130, the air from which the dust is separated by the first cyclone part 120. The filter part 140 filters out the dust contained in the air while the air passes through the filter part 140.

To this end, the filter part 140 may include a mesh portion 141 having a plurality of holes. The mesh portion 141 may be made of, but not limited to, a metal material.

Since the mesh portion 141 filters the air and the dust may be accumulated on the mesh portion 141, the mesh portion 141 needs to be cleaned.

Therefore, the cleaner according to the present disclosure may further include a compression part 150, for example, a simple cleaning system for cleaning the filter part 140.

The compression part 150 may include an operating part 151 disposed in the motor housing 200 so as to be movable in an upward/downward direction in the dust bin 100, a manipulation part 153 configured to be manipulated by the user to move the operating part 151 in the upward/downward direction, and a transmission part 155 configured to transmit an operating force of the manipulation part 153 to the operating part 151.

The manipulation part 153 may be disposed outside the motor housing 200. For example, the manipulation part 153 may be disposed at a position higher than a position of a motor 210 disposed in the motor housing 200. In addition, the manipulation part 153 may be disposed at a position higher than a position of the operating part 151.

The transmission part 155 is disposed in the motor housing 200 and formed to be elongated in the upward/downward direction. The manipulation part 153 is coupled to an upper end of the transmission part 155, and the operating part 151 is coupled to a lower end of the transmission part 155.

In a state in which the manipulation part 153 is not manipulated by the user, the operating part 151 is positioned above the filter part 140, and when the manipulation part 153 is manipulated, the operating part 151 is moved downward along an outer circumferential surface of the filter part 140.

The handle part 300 may include a handle body 310 configured to be grasped by the user, and a battery housing 320 disposed below the handle body 310 and configured to accommodate a battery 330.

In a state in which the user grasps the handle body 310 with his/her right hand, the manipulation part 153 may be positioned at the left side of the handle body 310.

Therefore, the user may easily manipulate the manipulation part 153 with his/her left hand that does not hold the handle body 310.

The manipulation part 153 may be moved in a direction parallel to an axis of the cyclone flow in the first cyclone part 120, for example, in the upward/downward direction in a state in which the dust bin 100 is placed on the floor.

A slot 210 may be formed in the motor housing 200 in order to allow the manipulation part 153 to move. The slot 210 may also extend in the direction parallel to the extension direction of the axis of the cyclone flow in the first cyclone part 120, that is, in the upward/downward direction.

As another embodiment, the slot 210 may be formed in the handle body 310.

In the present embodiment, since the extension direction of the axis of the cyclone flow is the upward/downward direction in the drawings, for example, the terms "extension direction of the axis of the cyclone flow" to be described below may be understood as meaning the "upward/downward direction".

Referring to FIG. 2, a diameter D1 of the motor housing 200 may be longer than a horizontal length L1 of the handle part 300. Further, the handle part 300 may be coupled to the motor housing 200 so that a center of the handle part 300 in a leftward/rightward direction is coincident with a center of the motor housing 200.

For example, the manipulation part 153 may be positioned at a boundary portion where the motor housing 200 and the handle part 300 are in contact with each other.

When the cleaner is placed so that the motor housing 200 and the handle part 300 are in contact with the floor F, a space is defined between an outer circumferential surface of the motor housing 200, an outer circumferential surface of the handle part 300, and the floor F because of a difference between the diameter D1 of the motor housing 200 and the horizontal length L1 of the handle part 300, and the manipulation part 153 may be positioned in the space.

In this state, the manipulation part 153 is spaced apart from the floor F.

Therefore, during the process of placing the cleaner on the floor F, it is possible to prevent the manipulation part 153 from colliding with the floor F, and as a result, it is possible to prevent the manipulation part 153 from being damaged or prevent the manipulation part 153 from being inadvertently operated.

For example, the transmission part 155 may be provided in the form of a circular bar, and the manipulation part 153 may be coupled to an upper end of the transmission part 155. That is, the transmission part 155 may have a horizontal cross section having a circular shape.

Further, the transmission part 155 may also extend in a direction parallel to the extension direction of the axis of the cyclone flow of the first cyclone part 120.

Since the operating part 151 is positioned inside the motor housing 200 and the manipulation part 153 is positioned outside the motor housing 200, the transmission part 155 may be positioned inside the motor housing 200 to connect the operating part 151 and the manipulation part 153. That is, the manipulation part 153 may penetrate the motor housing 200.

A compression rail part 220 for guiding the upward/downward movement of the transmission part 155 may be provided in the motor housing 200.

The compression rail part 220 may extend in a direction parallel to the extension direction of the axis of the cyclone flow of the first cyclone part 120.

Therefore, the transmission part 155 may move in the upward/downward direction along the compression rail part 220.

The motor 230 for generating a suction force may be disposed in the motor housing 200. The suction force generated by the motor 230 may be applied to the pipe connector 110.

The motor 230 may be disposed above the dust bin 100 and/or the battery 330 based on the extension direction of the axis of the cyclone flow of the first cyclone part 120. The manipulation part 153 may be disposed at a height equal to a height of at least a part of the motor 230 or positioned at a position higher than a position of the motor 230.

An air guide 240 may be disposed in the motor housing 200 to guide, to the motor 230, the air discharged from the second cyclone part 130.

The second cyclone part 130 may be coupled to a lower portion of the air guide 240. In a state in which the filter part 140 is coupled to the second cyclone part 130, the filter part 140 surrounds the second cyclone part 130.

Therefore, the filter part 140 may also be positioned below the air guide 240. In a state in which the manipulation part 153 is not manipulated, the operating part 151 may be disposed at a position so as to surround the air guide 240.

The operating part 151 may include a compression plate for cleaning the filter part 140.

In the present embodiment, in the state in which the manipulation part 153 is not manipulated, a position of the operating part 151 may be called a standby position of the simple cleaning system.

At the standby position of the simple cleaning system, the operating part 151 may be disposed so as not to overlap the filter part 140. Therefore, the air may pass through the filter part 140.

For example, at the standby position, the operating part 151 may be positioned at a position higher than a position of the filter part 140. Therefore, at the standby position, it is possible to prevent the operating part 151 from acting as flow resistance during the process in which the air passes through the filter part 140.

A dust guide 160 may be provided below the second cyclone part 130. A lower portion of the second cyclone part 130 may be coupled to an upper portion of the dust guide 160. In addition, a lower portion of the filter part 140 may be seated on the dust guide 160.

A lower portion of the dust guide 160 may be seated on a bottom surface of the dust bin 100. The dust guide 160 is spaced apart from an inner circumferential surface of the dust bin 100, such that an internal space of the dust bin 100 is divided into a first dust storage part 161 configured to store the dust separated by the first cyclone part 120, and a second dust storage part 163 configured to store the dust separated from the second cyclone part 130.

The first dust storage part 161 is defined by the inner circumferential surface of the dust bin 100 and an outer circumferential surface **163*b*-3 of the dust guide 160, and the second dust storage part 163 is defined by an inner circumferential surface of the dust guide 160**.

In the case in which the body cover is provided, the lower portion of the dust guide 160 may be seated on the body cover.

The compression plate constituting the operating part 151 may be made of an elastically deformable material. For example, the compression plate may be made of a rubber material. The compression plate may be formed in a ring shape so that the compression plate may clean the entire periphery of the cylindrical filter part 140. As another example, the compression plate may be made of silicone or a fiber material.

Further, at the standby position, the compression plate is on standby at position departing from the filter part 140. During a cleaning process, the compression plate moves in the upward/downward direction while wiping an outer surface of the filter part 140.

An inner circumferential surface of the compression plate may include a cleaning surface that comes into contact with the outer surface of the filter part 140 during the cleaning process. The cleaning surface is a surface, that is, a vertical surface facing the filter part 140.

Therefore, when the compression plate moves downward in a state in which the entire cleaning surface is in contact with a circumference of the filter part 140, the cleaning surface removes the dust attached to the outer surface of the filter part 140.

A diameter of the cleaning surface may be smaller than a diameter of the filter part 140. In the present embodiment, since the compression plate is made of an elastically deformable material, the compression plate may be elastically deformed outward in a radial direction of the filter part 140 during a process in which the compression plate moves downward and the cleaning surface comes into contact with the filter part 140. In the state in which the compression plate is elastically deformed, the cleaning surface may come into contact with the filter part 140.

That is, in the state in which the cleaning surface is in contact with the filter part 140, the cleaning surface may compress the filter part 140. As described above, since the cleaning surface cleans the filter part 140 in the state in which the cleaning surface compresses the filter part 140, the dust attached to the filter part 140 may be effectively removed from the filter part 140.

In addition, since the compression plate is made of an elastically deformable material and the entire periphery of the cleaning surface compresses the filter part 140, the state in which the cleaning surface of the compression plate compresses the filter part 140 is maintained even though a center of the compression plate is inclined with respect to the axis of the cyclone flow during the process in which the compression plate moves downward, such that the filter part 140 may be cleaned.

The compression plate may include an inclined surface inclinedly extending upward and outward in the radial direction from the cleaning surface.

Since the inclined surface is inclined upward and outward, an inner diameter of the inclined surface of the compression plate increases toward the upper side. Further, the inclined surface is spaced apart from the outer circumferential surface of the filter part 140.

The operating part 151 may further include a frame configured to support an outer circumference of the compression plate, and a core portion configured to support an inner circumference of the compression plate.

The core portion may be in contact with a part of the inner circumferential surface of the compression plate.

For example, the core portion may be in contact with an inclined inner surface of the compression plate.

A coupling protrusion may be formed on the compression plate, a coupling hole may be formed in the core portion, and the core portion may be coupled to the compression plate by inserting the coupling protrusion into the coupling hole.

The frame supports the compression plate and is coupled to the core portion, thereby fixing the position of the compression plate.

The transmission part 155 may be provided in the form of a long cylindrical bar. The purpose of this configuration is to enable the transmission part 155 to smoothly move when the transmission part 155 moves in the upward/downward direction in the motor housing 200.

In the present embodiment, the compression plate may be integrally with the core portion and the frame by dual injection molding.

The dust guide 160 may include a storage wall **163*a* configured to define the second dust storage part 163, and a support portion 163*b* provided at an upper side of the storage wall 163*a* and configured to support the second cyclone part 130**.

The storage wall **163*a* is provided in the form of a column having a horizontal cross section having a circular shape, and a diameter of the storage wall 163*a* decreases from the upper side toward the lower side so that a space of the first dust storage part 161** is maximized.

The dust guide 160 may further include an anti-scattering rib 165 extending downward from an upper end of the storage wall **163*a***.

For example, the anti-scattering rib 165 may be formed in a cylindrical shape and may surround an upper portion of the storage wall **163*a* in a state in which the anti-scattering rib 165 is spaced apart from the storage wall 163*a***.

Since the diameter of the storage wall **163*a* decreases toward the lower side, a space is defined between an outer circumferential surface of the storage wall 163*a* and the anti-scattering rib 165**.

The cyclone flow may move downward while flowing along the inner circumferential surface of the dust bin 100. When the cyclone flow reaches a bottom surface of the body cover or the dust bin 100 during the process in which the cyclone flow moves downward, a rotation flow may be changed to an upward flow again.

If there is the upward flow in the first dust storage part 161, there is a problem in that the dust stored in the first dust storage part 161 is scattered.

In the case of the present embodiment, when the upward flow in the first dust storage part 161 reaches the anti-scattering rib 165 in the space between the anti-scattering rib 165 and the storage wall **163*a***, a direction of the upward flow is changed, and the upward flow is changed to a downward flow again.

Therefore, the dust stored in the first dust storage part 161 may be prevented from scattering, and thus the dust may be prevented from flowing reversely toward the second cyclone part 130.

Since the anti-scattering rib 165 extends downward from the upper end of the storage wall **163*a*, the dust separated by the first cyclone part 120, together with the cyclone flow, may be smoothly moved to the first dust storage part 161 by the anti-scattering rib 165**.

Meanwhile, the support portion **163*b* may include an insertion portion 163*b*-1 inserted into the lower portion of the filter part 140. When the insertion portion 163*b*-1 of the support portion 163*b* is inserted into the lower portion of the filter part 140, a lower end of the filter part 140 is seated on a support surface 163*b*-2 positioned around the insertion portion 163*b*-1 of the support portion 163*b***.

In the state in which the filter part 140 is seated on the support surface **163*b*-2, the compression plate passes the filter part 140** while moving downward.

A diameter of an outer circumferential surface **163*b*-3 of the support portion 163*b* may decrease toward the lower side in order to prevent the outer circumferential surface 163*b*-3 of the support portion 163*b* from interfering with the compression plate during a process in which the compression plate moves downward. That is, the outer circumferential surface 163*b*-3 of the support portion 163*b*** may be inclined inward toward the lower side.

In addition, a maximum diameter of the outer circumferential surface **163*b*-3 of the support portion 163*b* may be equal to or smaller than a diameter of the outer circumferential surface of the filter part 140**.

In addition, when the dust stored in the first dust storage part 161 is compressed while the compression plate moves downward, the compressed dust may easily move downward because the outer circumferential surface **163*b*-3 of the support portion 163*b*** inclined inward.

The anti-scattering rib 165 may extend downward from a boundary portion between the support portion **163*b* and the storage wall 163*a*. An outer circumferential surface of the anti-scattering rib 165 may be inclined to define a continuous surface with an outer circumferential surface of the support portion 163*b*. That is, an outer diameter of the outer circumferential surface of the anti-scattering rib 165** may decrease toward the lower side.

Since the manipulation part 153 is positioned outside the handle part 300, the user may press an upper surface of the manipulation part 153 downward.

The manipulation part 153 may include a first portion positioned inside the motor housing 200, and a second portion extending in a horizontal direction from the first portion and positioned outside the motor housing 200.

The transmission part 155 is connected to the first portion. The first portion may have a fitting groove into which a part of the transmission part 155 is fitted.

A horizontal cross section of a part of the transmission part 155, which is inserted into the fitting groove, may be formed in a non-circular shape so that a relative rotation between the transmission part 155 and the manipulation part 153 is prevented during the process of manipulating the manipulation part 153.

Since the user needs to push the second portion, a horizontal width of the second portion may be larger than a horizontal width of the first portion.

In addition, an elastic member (not illustrated) for elastically supporting the manipulation part 153 in the state in which the compression part 150 is positioned at the standby position may be further included in the compression rail part 220.

The elastic member may elastically support the manipulation part only in an initial section in a section in which the manipulation part 153 moves downward, and in other sections, the manipulation part 153 may not be elastically supported.

Therefore, since the elastic member supports the manipulation part 153, the compression part 150 may be prevented from being moved downward inadvertently by a load of the compression part 150.

The elastic member may have various shapes and structures.

Meanwhile, in the cleaner according to the present disclosure, the compression rail part 220 for guiding the upward/downward movement of the transmission part 155 is not provided outside the dust bin 100, and the upward/downward movement of the transmission part 155 is guided only by the compression rail part 220 positioned in the motor housing 200.

Therefore, in comparison with the case in which the compression rail part is provided on an outer circumferential surface of dust bin 100, an outer diameter of the dust bin 100 may be increased, and as a result, it is possible to ensure a sufficient interval d1 between the inner circumferential surface of the dust bin 100 and the second cyclone part 130.

For example, because the interval d1 of 14 mm or more may be ensured between the inner circumferential surface of the dust bin 100 and the second cyclone part 130, it is possible to effectively prevent large foreign substances such as pieces of cereal from being caught at an outlet of the pipe connector 110.

In the present embodiment, the operating part 151 may be moved downward when the user manipulates the manipulation part 153 in one direction. In a state in which the operating part 151 is moved downward to a lowered position, the user may return the operating part 151 to the standby position by moving the manipulation part 153 in the other direction.

In the present embodiment, the cleaner may not have a returning means for returning the operating part 151 to the standby position from the lowered position, but the returning means may be provided.

The pipe connector 110 to which the suction part is coupled is coupled to the dust bin 100, and the dust bin 100 provided with the pipe connector 110 is coupled to the motor housing 200 so as to be separable in the upward/downward direction.

In order to separably couple the dust bin 100 and the motor housing 200, the dust bin 100 and the motor housing 200 may have coupling means.

For example, referring to FIG. 4, a threaded portion 170 to be coupled to the motor housing 200 may be provided at an upper end of the dust bin 100.

In another embodiment, a coupling means having another structure may be provided instead of the threaded portion 170.

In order to increase a sealing force between the dust bin 100 and the motor housing 200 coupled to be separable in the upward/downward direction, a sealing member 180 may be positioned at a contact portion between the dust bin 100 and the motor housing 200, for example, at the upper end of the dust bin 100.

As described above, since the dust bin 100 and the motor housing 200 are provided to be separable in the upward/downward direction, it is possible to increase a sealing force between the dust bin 100 and the motor housing 200.

An electric terminal part 250 is positioned on the motor housing 200 and disposed at a position adjacent to the pipe connector 110. When the suction part is coupled to the pipe connector 110, the electric terminal part 250 is coupled to a terminal of the suction part and supplies electricity to the suction part.

In the case of the cleaner in the related art, it was not easy to wash the dust bin with water when using the cleaner in which an electric wire and a terminal part, through which electricity flows, are connected to a cleaner main body and the dust bin. In particular, when the cleaner is operated in a state in which the cleaner is washed with water accidentally by a consumer and moisture is not removed, there is a likelihood that an electric short circuit occurs, which causes a safety problem.

In contrast, since the cleaner according to the present disclosure has the electric terminal part 250 installed on the motor housing 200, the dust bin including no electrical component may be separated from the motor housing and then washed with water to meet the needs of the consumer. Further, lengths of electric wires of the motor and/or an inverter may be reduced.

Further, a structure, for example, a strength reinforcing lead or the like for reinforcing strength of the pipe connector 110 connected to the suction part may be provided on a lower portion of the pipe connector 110 of the dust bin 100.

Hereinafter, a cleaner according to a second embodiment of the present disclosure will be described with reference to FIGS. 7 to 16.

Figure 7:
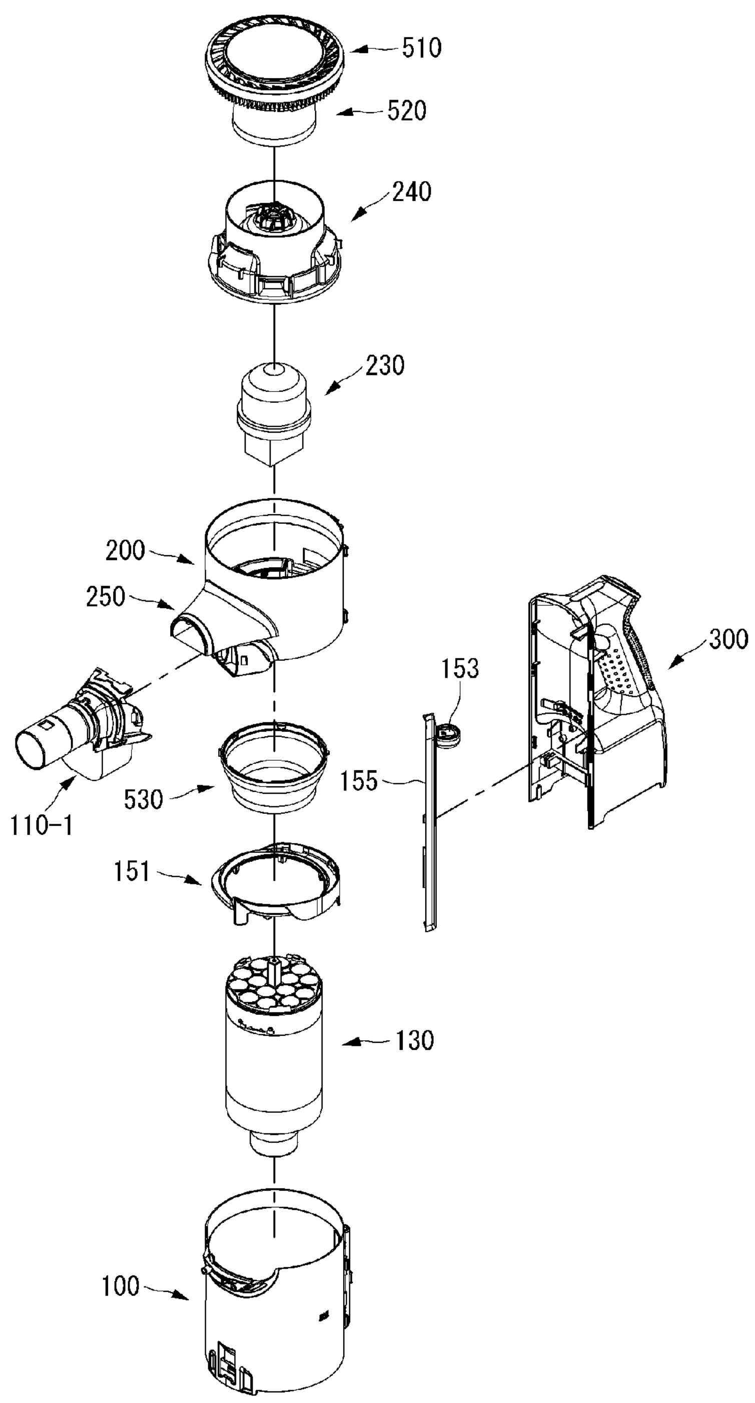
FIG. 7 is an exploded perspective view illustrating a cleaner according to a second embodiment of the present disclosure.
Figure 8:
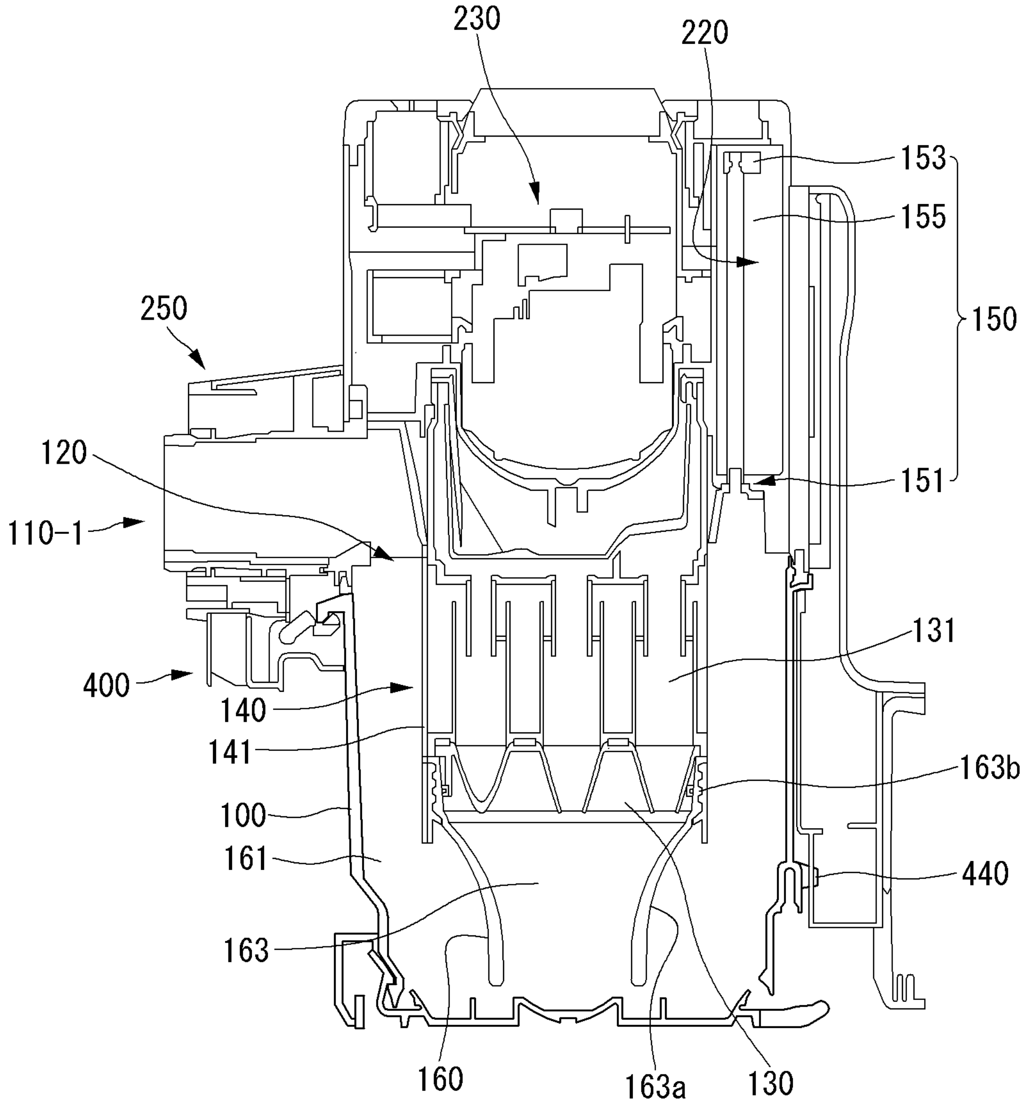
FIG. 8 is a view illustrating a state in which a dust bin and a motor housing of the cleaner according to the second embodiment of the present disclosure are coupled.

FIG. 7 is an exploded perspective view illustrating the cleaner according to the second embodiment of the present disclosure, and FIG. 8 is a view illustrating a state in which a dust bin and a motor housing of the cleaner according to the second embodiment of the present disclosure are coupled.

Further, FIGS. 9 to 16 are views illustrating a process of separating the dust bin and the motor housing of the cleaner according to the second embodiment of the present disclosure.

In the description of the cleaner according to the second embodiment, constituent elements identical to the above-mentioned constituent elements of the cleaner according to the first embodiment will be assigned with the same reference numerals, and a description thereof will be replaced with the description of the first embodiment.

The cleaner according to the second embodiment differs from the cleaner according to the first embodiment in that the pipe connector is fixedly coupled to the motor housing instead of the dust bin and a structure for fastening/unfastening the dust bin and the pipe connector is provided.

The cleaner according to the present embodiment will be described. A pipe connector 110-1 is fixedly coupled to the motor housing 200 instead of the dust bin 100.

Further, the cleaner further includes a fastening part 400 configured to couple the dust bin 100 to the motor housing 200 in such a way that the dust bin 100 is separable from the motor housing 200.

The fastening part 400 includes a button 410 positioned below the pipe connector 110-1, and a hook 420 positioned in a space between the button 410 and the dust bin 100.

The hook 420 may be rotated clockwise as the button 410 is pushed.

The fastening part 400 may further include a first catching projection 430 positioned on an outer surface of the dust bin 100.

The first catching projection 430 may be fastened to and/or unfastened from the hook 420 in accordance with whether the hook 420 rotates.

The fastening part 400 may further include a second catching projection 440 positioned on a lower portion of the outer surface of the dust bin which is opposite to the first catching projection 430.

The second catching projection 440 may be coupled to a groove 340 formed in the handle part 300.

The hook 420 may have a first inclined surface 421 configured to come into contact with a rib 411 to rotate the hook 420 clockwise, and a second inclined surface 422 extending from the first inclined surface 421 and configured to rotate the hook 420 counterclockwise.

In FIG. 7, non-described reference numeral 510 indicates a HEPA filter, non-described reference numeral 520 indicates a prefilter, and non-described reference numeral 530 indicates a dust cap.

Figure 9:
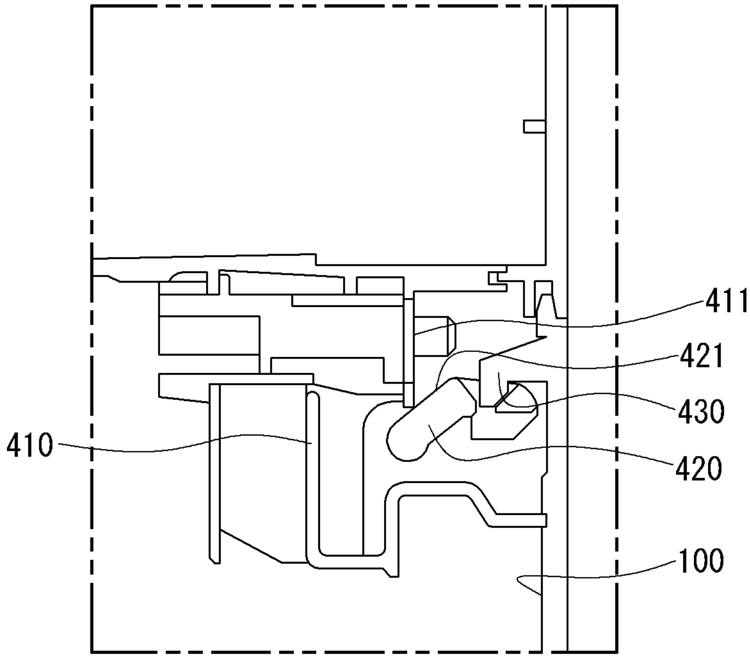
FIGS. 9 to 16 are views illustrating a process of separating the dust bin and the motor housing of the cleaner according to the second embodiment of the present disclosure.

According to the fastening part 400 configured as described above, the dust bin 100 is coupled to the motor housing 200 in a state in which the hook 420 and the first catching projection 430 are kept fastened to each other and the second catching projection 440 is coupled to the groove 340 of the handle part 300 (see FIGS. 8 and 9).

Figure 10:
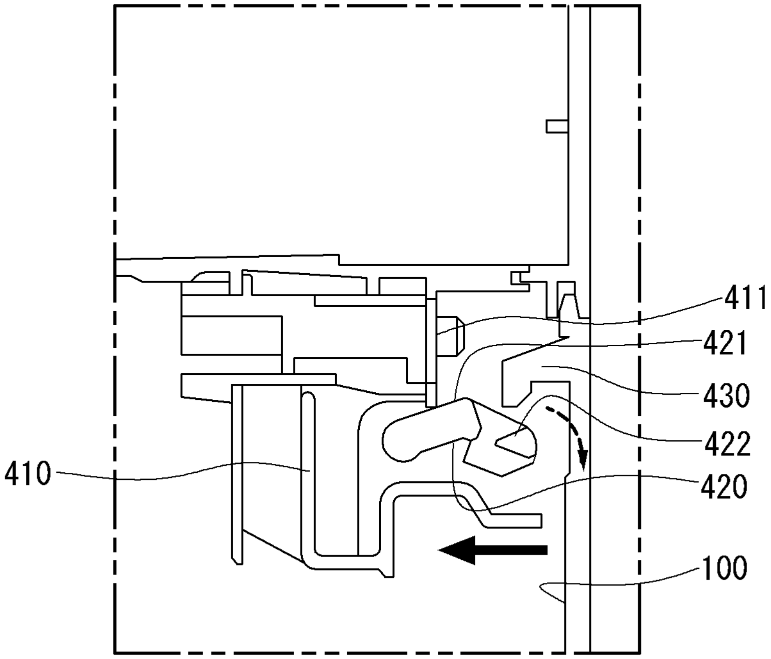

In this state, when the button 410 is pressed in a direction opposite to the dust bin 100 in order to separate the dust bin 100 from the motor housing 200, the rib 411 presses the first inclined surface 421 of the hook 420 downward, such that the hook 420 is rotated clockwise and the hook 420 and the first catching projection 430 are unfastened (see FIG. 10).

Figure 11:
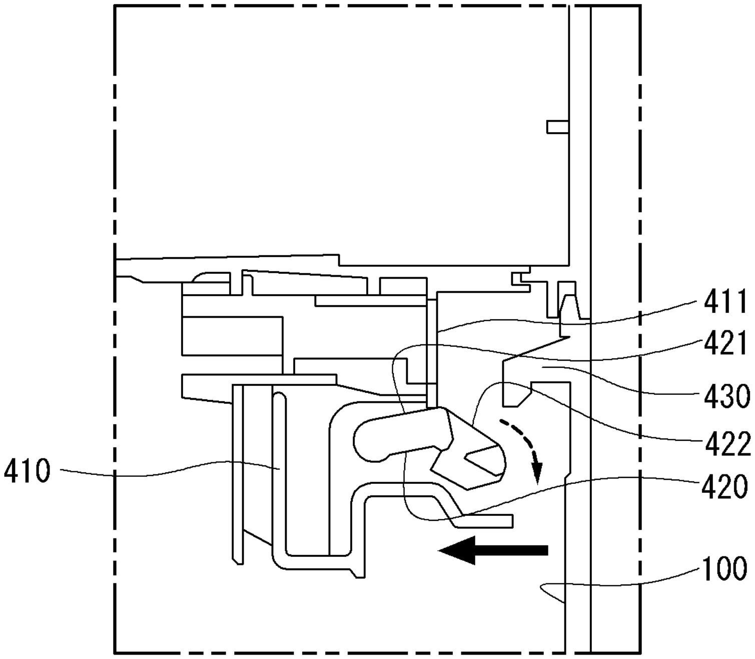
Figure 12:
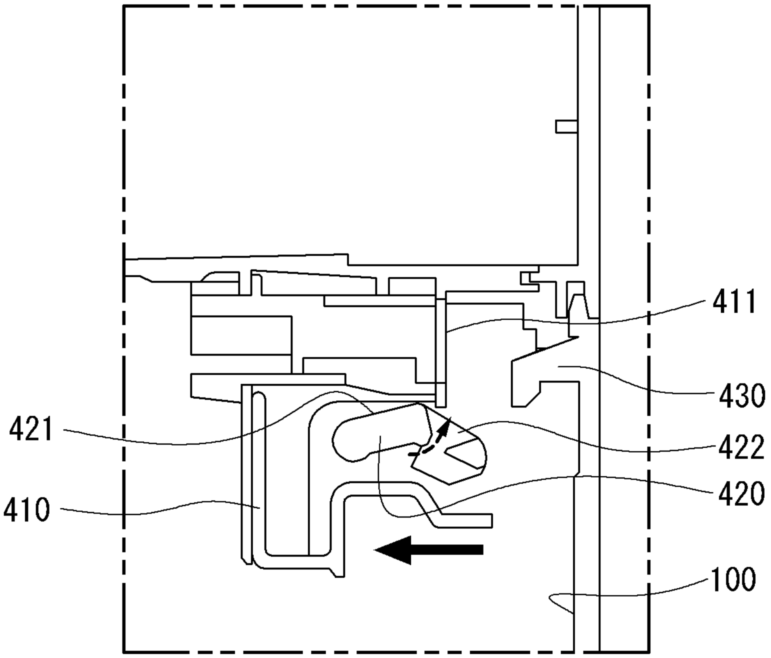

Further, the clockwise rotation of the hook 420 is performed until the rib 411 reaches a boundary point between the first inclined surface 421 and the second inclined surface 422 (see FIG. 11). The hook 420 begins to rotate counterclockwise at a point in time at which the rib 411 passes the boundary point between the first inclined surface 421 and the second inclined surface 422 and comes into contact with the second inclined surface 422 (see FIG. 12).

Figure 13:
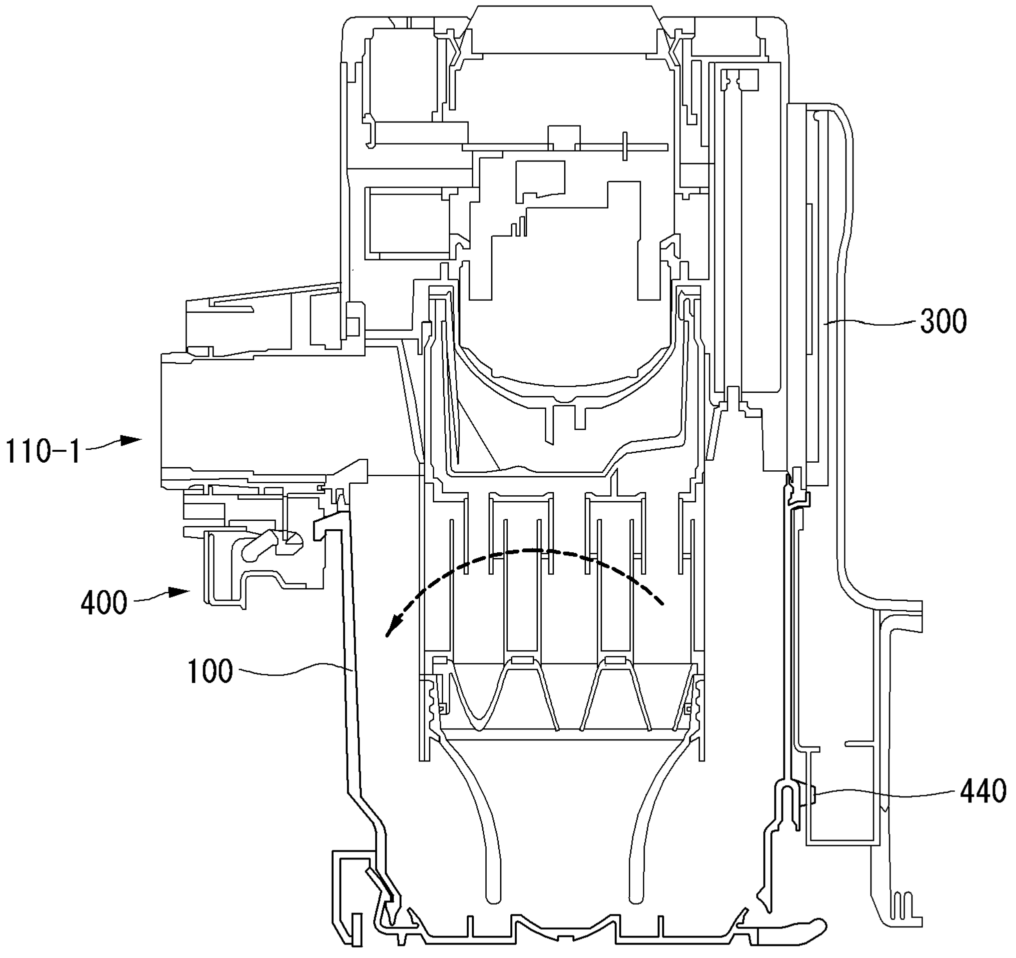

When a front portion of the dust bin 100 (a portion directed toward the pipe connector) is pushed downward in the state in which the hook 420 and the first catching projection 430 are unfastened as described above, the dust bin 100 is rotated by a predetermined angle about the second catching projection 440 (see FIG. 13).

Figure 14:
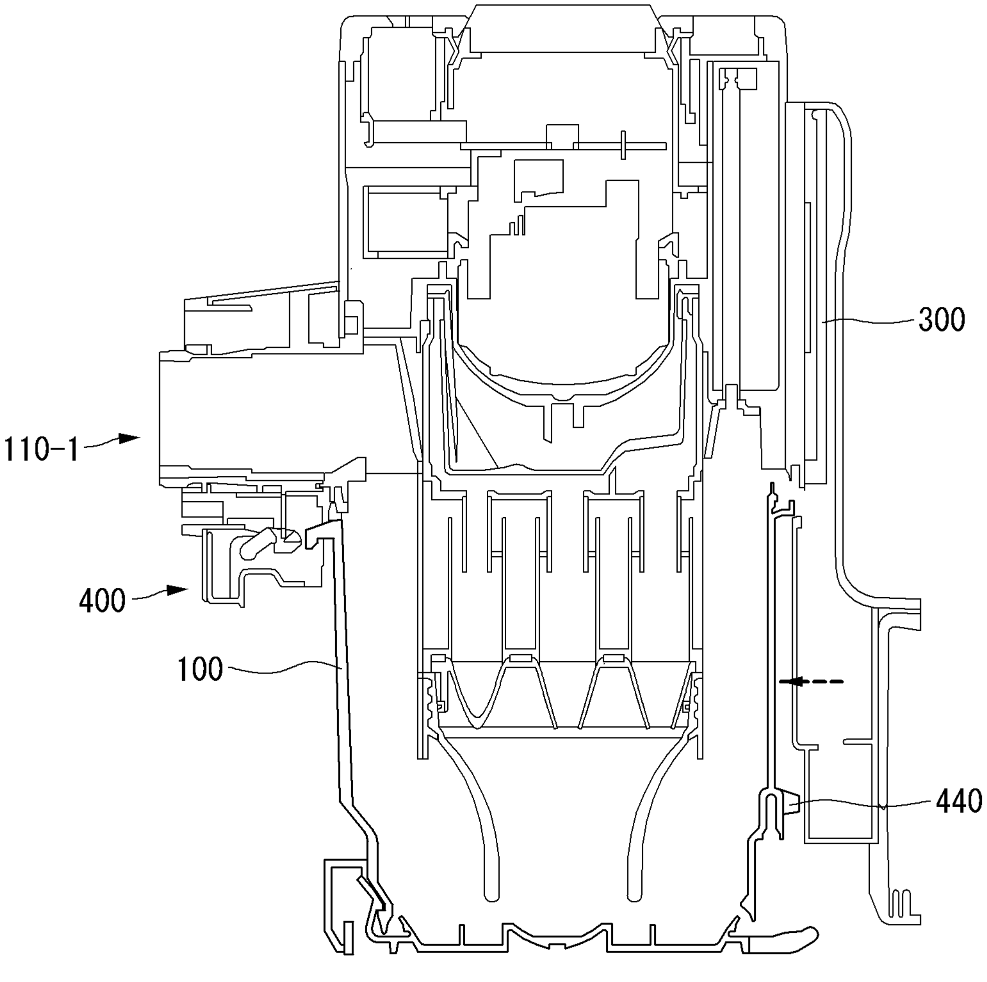
Figure 15:
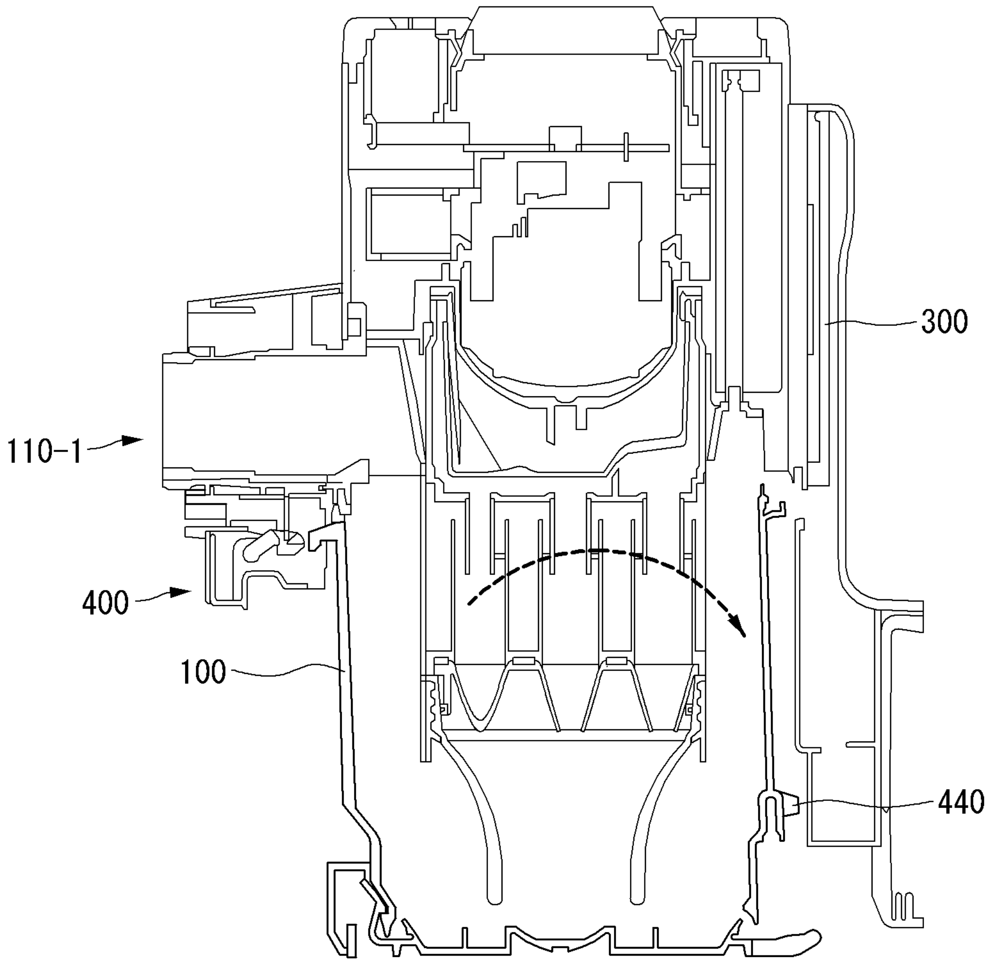
Figure 16:
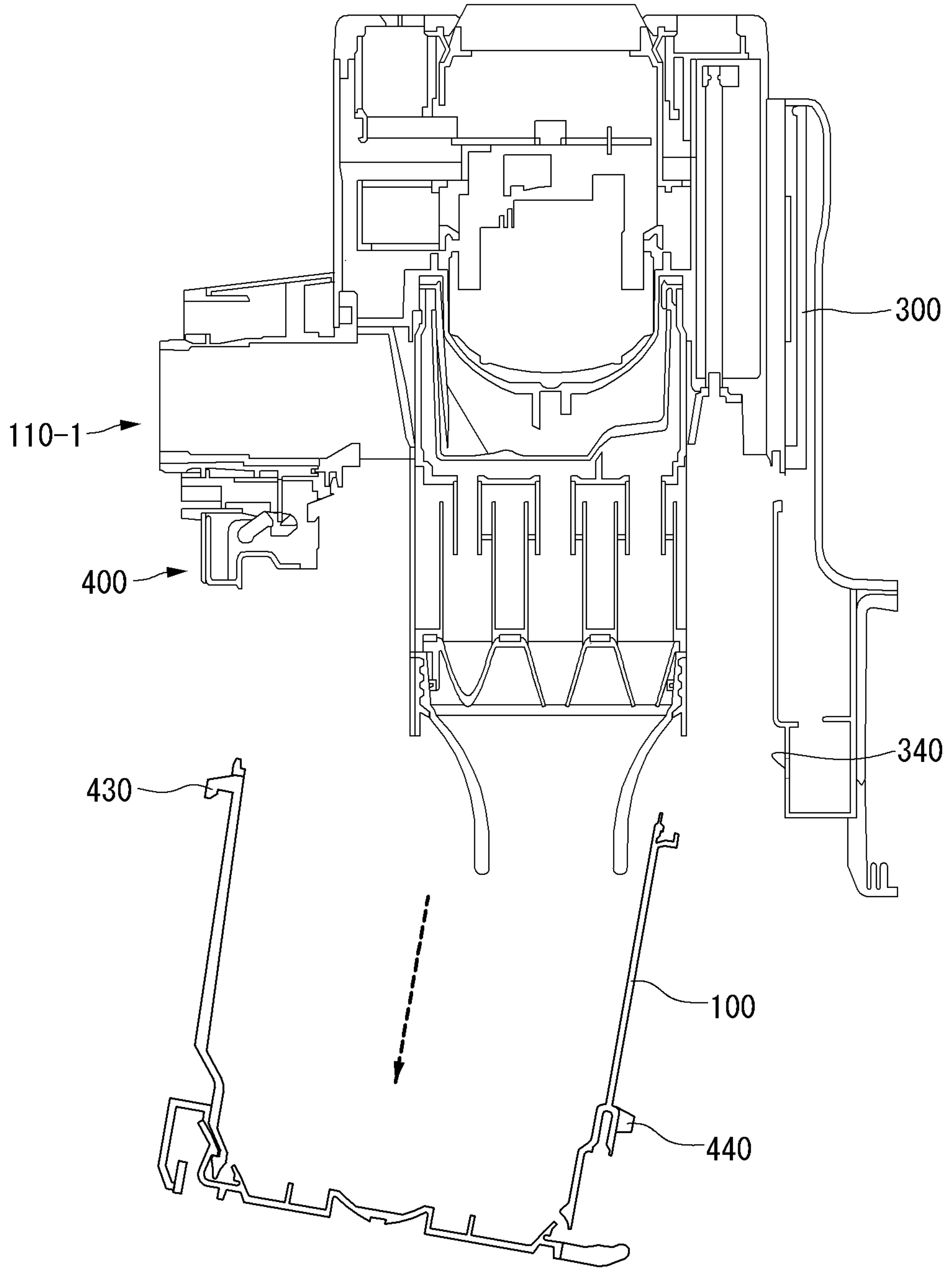

Thereafter, the dust bin 100 is slightly pushed forward, such that the second catching projection 440 is separated from the groove 340 of the handle part 300 (see FIG. 14). A rear portion of the dust bin 100 is pushed downward again, such that the dust bin 100 is separated from the motor housing 200.

After the dust bin 100 is separated from the motor housing 200 by the above-mentioned process, the dust bin 100 may be cleaned. The dust bin 100 cleaned by the user is coupled to the motor housing 200 again in the reverse order of the above-mentioned process.

Meanwhile, the terminal part 250 may be positioned on the motor housing 200 and disposed to be adjacent to the pipe connector 110-1. The terminal part 250 supplies electricity to the suction part when the suction part is coupled to the pipe connector 110-1.

While the embodiments of the present disclosure have been described with reference to the accompanying drawings, those skilled in the art to which the present disclosure pertains will understand that the present disclosure may be carried out in any other specific form without changing the technical spirit or essential features thereof. Therefore, it should be understood that the above-described embodiments are illustrative in all aspects and do not limit the present disclosure.

The invention claimed is:

1. A cleaner comprising:
- a suction part configured to introduce air to the cleaner;
- a motor configured to generate a suction force for introducing the air through the suction part;
- a motor housing that accommodates the motor;
- a handle coupled to the motor housing;
- cyclone parts coupled to a lower side of the motor housing and configured to separate dust from the air introduced through the suction part;
- a dust bin that accommodates the cyclone parts and is separably coupled to a lower portion of the motor housing, the dust bin being configured to store the dust;
- a filter disposed in the dust bin and configured to filter air having separated the dust through the cyclone parts; and
- a compression part configured to compress the dust stored in the dust bin, wherein the compression part comprises:
- an operating part disposed in the motor housing and configured to move along an up-down direction in a space defined between an outer portion of the filter and an inner circumferential surface of the dust bin,
- a manipulation part disposed outside the motor housing and configured to be manipulated to translate relative to the handle to cause the operating part to move in the up-down direction, and
- a transmission part that is disposed in the motor housing and connects the operating part to the manipulation part, wherein the dust bin is configured to be separated from the motor housing and become disconnected from the motor housing, wherein the operating part and the transmission part are configured to remain in the motor housing based on the dust bin being separated from the motor housing, and wherein the manipulation part is configured to remain outside the motor housing based on the dust bin being separated from the motor housing.

2. The cleaner of claim 1, wherein the compression part further comprises a compression rail disposed in the motor housing and configured to guide movement of the transmission part in the up-down direction.

3. The cleaner of claim 2, wherein the dust bin is configured to be coupled to and separated from the motor housing in the up-down direction.

4. The cleaner of claim 3, further comprising a sealing member configured to seal a gap between the dust bin and the motor housing.

5. The cleaner of claim 4, wherein the sealing member is disposed at an upper end of the dust bin or a lower end of the motor housing.

6. The cleaner of claim 5, further comprising a pipe connector that is configured to connect to the suction part, wherein the cyclone parts comprise:
- a first cyclone part that is in fluid communication with the pipe connector; and
- a second cyclone part configured to separate dust from air discharged from the first cyclone part, and wherein the filter surrounds the second cyclone part.

7. The cleaner of claim 6, wherein the inner circumferential surface of the dust bin is spaced apart from an outer circumferential surface of the second cyclone part by an interval of 14 mm or more.

8. The cleaner of claim 7, wherein each of the motor housing and the dust bin has a cylindrical shape, wherein a width of the handle in a left-right direction is less than a diameter of each of the motor housing and the dust bin, and wherein the manipulation part is configured to be spaced apart from a floor surface based on the motor housing, the dust bin, and the handle being in contact with the floor surface.

9. The cleaner of claim 1, further comprising a pipe connector fixed to the motor housing and configured to couple to the suction part.

10. The cleaner of claim 9, comprising:

a fastening part configured to couple the dust bin to the motor housing and to decouple the dust bin from the motor housing.

11. The cleaner of claim 10, wherein the handle defines a groove configured to be coupled to the fastening part, and wherein the fastening part comprises:

a button disposed below the pipe connector;

a hook disposed between the button and the dust bin and configured to rotate based on the button being pushed;

a first catching projection disposed at an outer surface of the dust bin and configured to be coupled to and decoupled from the hook based on rotation of the hook; and a second catching projection disposed at a lower portion of the outer surface of the dust bin and disposed at a position opposite to the first catching projection, the second catching projection being configured to couple to the groove of the handle.

12. The cleaner of claim 11, wherein the fastening part further comprises a rib configured to contact the hook based on rotation of the hook, and wherein the hook comprises:

a first inclined surface configured to, based on the button moving relative to the rib, contact the rib to thereby rotate the hook in a clockwise direction; and a second inclined surface that extends from the first inclined surface and is configured to move toward the rib based on the hook rotating in a counterclockwise direction.

13. The cleaner of claim 10, further comprising a terminal disposed at the motor housing and disposed adjacent to the pipe connector, the terminal being configured to supply electricity to the suction part based on the suction part being coupled to the pipe connector.

14. The cleaner of claim 1, further comprising a pipe connector fixed coupled to the dust bin and configured to couple to the suction part.

15. The cleaner of claim 14, wherein the pipe connector is configured to be separated from the motor housing based on the dust bin being separated from the motor housing.

16. The cleaner of claim 14, further a terminal disposed at the motor housing and disposed adjacent to the pipe connector, the terminal being configured to supply electricity to the suction part based on the suction part being coupled to the pipe connector.

17. The cleaner of claim 16, wherein at least a portion of the dust bin supports the pipe connector.

18. The cleaner of claim 16, wherein the pipe connector is attached to and supported by an outer circumferential surface of the dust bin.

19. The cleaner of claim 1, further comprising a support portion that is disposed inside the dust bin and supports the cyclone parts.

20. A cleaner comprising:

a suction part configured to introduce air to the cleaner;

a motor configured to generate a suction force for introducing the air through the suction part;

a motor housing that accommodates the motor;

a handle coupled to the motor housing;

cyclone parts coupled to a lower side of the motor housing and configured to separate dust from the air introduced through the suction part;

a dust bin that accommodates the cyclone parts and is separably coupled to a lower portion of the motor housing, the dust bin being configured to store the dust;

a filter disposed in the dust bin and configured to filter air having separated the dust through the cyclone parts;

a pipe connector fixed to the motor housing and configured to couple to the suction part;

a fastening part configured to couple the dust bin to the motor housing and to decouple the dust bin from the motor housing; and a compression part configured to compress the dust stored in the dust bin, wherein the compression part comprises:

an operating part disposed in the motor housing and configured to move along an up-down direction in a space defined between an outer portion of the filter and an inner circumferential surface of the dust bin, a manipulation part disposed outside the motor housing and configured to be manipulated to cause the operating part to move in the up-down direction, and a transmission part that is disposed in the motor housing and connects the operating part to the manipulation part, wherein the handle defines a groove configured to be coupled to the fastening part, and wherein the fastening part comprises:

a button disposed below the pipe connector, a hook disposed between the button and the dust bin and configured to rotate based on the button being pushed, a first catching projection disposed at an outer surface of the dust bin and configured to be coupled to and decoupled from the hook based on rotation of the hook, and a second catching projection disposed at a lower portion of the outer surface of the dust bin and disposed at a position opposite to the first catching projection, the second catching projection being configured to couple to the groove of the handle.

* * * * *